United States Patent [19]

Ley

[11] Patent Number: 4,660,507

[45] Date of Patent: Apr. 28, 1987

[54] SANITARY WINDOW BIRD PERCH

[76] Inventor: Robert R. Ley, 1511 Bushard St., Apt. #79, Westminster, Calif. 92683

[21] Appl. No.: 793,308

[22] Filed: Oct. 31, 1985

[51] Int. Cl.⁴ ............................................. A01K 31/12
[52] U.S. Cl. ...................................................... 119/2.6
[58] Field of Search ........................................... 119/26

[56] References Cited

U.S. PATENT DOCUMENTS

| | | | |
|---|---|---|---|
| 2,675,781 | 4/1954 | Bielefeld | 119/26 |
| 2,717,577 | 9/1955 | Petsche | 119/26 |
| 2,720,188 | 10/1955 | Hofrichter | 119/26 |
| 3,398,719 | 8/1968 | Walker | 119/26 |

Primary Examiner—Hugh R. Chamblee

[57] ABSTRACT

A bird perch easily attached to a vertical surface and containing a surface to collect bird droppings and position the bird a distance from the window sufficient to limit the soiling of the window surface by the bird.

1 Claim, 2 Drawing Figures

SANITARY WINDOW BIRD PERCH

FIELD OF INVENTION

The present invention provides a sanitary bird perch that can be conveniently affixed to a vertical surface such as a window. Due to the inability of the bird to control droppings, birds represent a sanitary problem. In addition, birds as pets are prone to look out a window and to drool on the window.

DESCRIPTION OF PRIOR ART

Prior bird perches are generally designed to allow the bird to sit at a specific location. Unless moved directly in front of a window, the bird is unable to see out the window. The usual perch assembly does not necessarily allow the bird to move back and forth in front of the window. Should a table or other convenient support be placed near the window, to allow the bird to perch on the surface, a problem of the bird droppings is created. Should the table or other perch be positioned too close to the window the bird will touch the window surface and drool on the window. Other available bird perches are of a design that is either bulky and difficult to position next to a window or are fragile in construction such that the perch does not allow a larger bird to safely sit on the perch.

The present invention overcomes the sanitary problem by collecting the bird droppings in a manner that the droppings can be easily removed while allowing the bird to look out the window. The present invention allows the bird to move freely parallel to the surface of the window and positions the bird at a distance sufficient to limit soiling of the window.

SUMMARY OF OBJECTIVES OF THE INVENTION

The primary objective of the invention is to provide a safe and sanitary window perch for a bird.

Although not specifically described in detail other objects of this invention will become apparent when the enclosed description and drawings are reviewed.

DESCRIPTION OF THE PREFERRED EMBODIMENT

Figure 1:
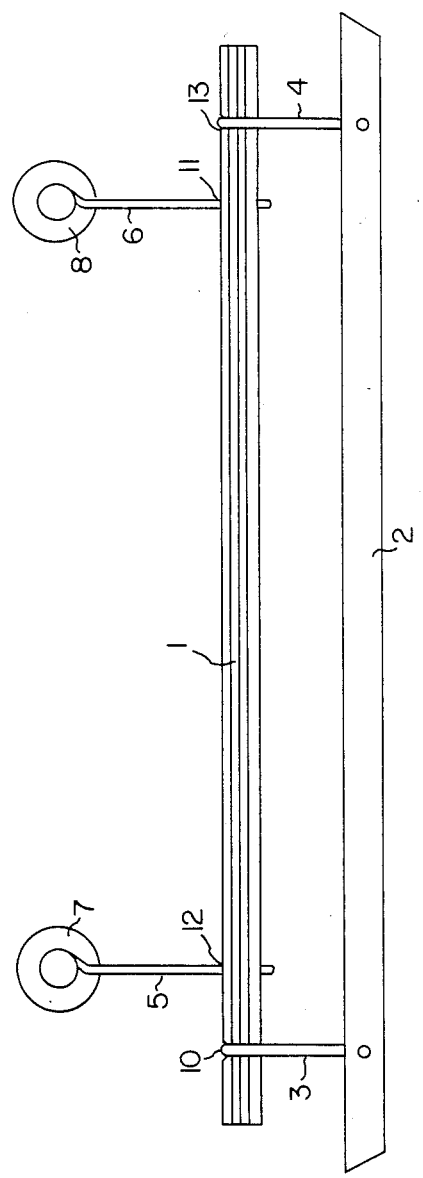
FIG. 1 is a front view of the invention.
Figure 2:
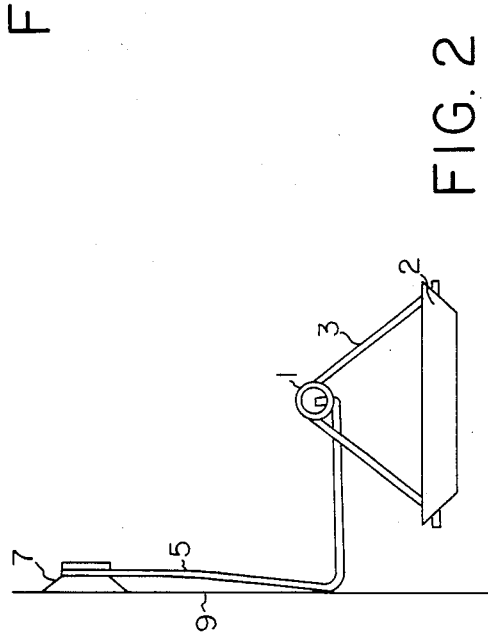
FIG. 2 is a side view of the left side of the invention and illustrates the invention attached to a pane of glass or other suitable surface.

The perch is an assembly easily attached to the glass of a window pane and allows a bird to perch and look out the window. Referring to FIG. 1, a front view of the invention is shown. There are eight parts to the preferred embodiment. The perch (1) is formed from fluted plastic or wood rod. Rods with a diameter of 9.5 to 13.0 millimeters for small birds and 15.0 to 20.0 millimeters for larger birds has been successfully used. Two knotches (10, 13) are positioned symmetrically about the middle of the device. The two knotches (10, 13), one at each end of the perch, are designed to easily accept the drop pan hangers (3, 4). Two holes (12, 13), located symetrically at either end, are of a size and shape to allow an easy fit of the perch hangers (5, 6). The perch hangers (5, 6), as shown in FIG. 2, are formed in a shape of an L with sufficient angle and length to assure the drop pan (2) does not make contact with the window surface and that the perch rod is at a sufficient distance that the bird is unable to make contact with the window without leaving the perch. The other end of the perch hangers (5, 6) is attached to the perch hanger window attachment devices (7, 8). The perch hanger window attachment devices attach to the window surface (9). The perch hanger window attachment device (7, 8) may be any attachment means but most successful, due to the ease of installation, has been the use of suction cups.

A drop pan (4) is suspended below the perch (1) to catch the bird's droppings. A piece of newspaper or other suitable material is placed in the drop pan (2) to absorb the droppings and assist in cleaning th drop pan (2).

The material forming the perch hangers (5, 6) or the drop pan hangers (3, 4) may be from any durable sturdy material that will reasonably mintain the desired shape when used as described above.

The suction cups are selected to be economically available and of a sufficient size to prevent the window perch assembly and bird from falling. For the larger bird the length of the perch hangers (5, 6) extending perpendicular from the vertical surface (9) should be shorter than the length of the perch hanger (5, 6) attached to the window attachment devices (7, 8). The reduced length reduces the force required to prevent the separation of the attachment devices (7, 8). The length of the perch hangers (5, 6) should not be shortened to a length that would allow the bird to touch the window. The simplicity of the design allows the length of the perch to be easily adjusted for various size birds.

I claim:

1. A window bird perch comprising:
   a. a perch rod;
   b. a drop pan longer than the perch rod;
   c. a suspension means that positions the drop pan below the perch rod;
   d. a surface attachment means that is parallel to a vertical surface and comprising a plurality of suction cups and a plurality of wires formed in the shape of an L and each having an attachment means to the perch rod at one end and an attachment means to the plurality of suction cups at the other end with the end of the L shaped wire that attaches to the perch rod having a small upward projection sufficient to engage the perch rod and where the perch rod has a plurality of holes on the downward side of a size sufficient to accept the upward projection of the L shaped wire and the L shaped wire is of a size sufficiently narrow to deter the bird from sitting on the wire and the surface attachment means positions the perch rod at a distance sufficient to prevent the bird from making contact with the vertical surface with its beak.

* * * * *